(12) United States Patent  
Oh et al.

(10) Patent No.: US 8,194,171 B2
(45) Date of Patent: Jun. 5, 2012

(54) APPARATUS FOR OPTICALLY COMBINING VISIBLE IMAGES WITH FAR-INFRARED IMAGES

(75) Inventors: Hyun-hwa Oh, Yongin-si (KR); Chi-ho Hwang, Daejeon-si (KR); Hee-chul Lee, Daejeon-si (KR); Seong-deok Lee, Suwon-si (KR); Yong-soo Lee, Daejeon-si (KR); Won-hee Choe, Gyeongju-si (KR); Il-woong Kwon, Daejeon-si (KR); Hyuck-jun Son, Seoul (KR)

(73) Assignees: Samsung Electronics Co., Ltd., Suwon-Si (KR); Korea Advanced Institute of Science and Technology, Daejeon-Si (KR)

( * ) Notice: Subject to any disclaimer, the term of this patent is extended or adjusted under 35 U.S.C. 154(b) by 457 days.

(21) Appl. No.: 12/564,193

(22) Filed: Sep. 22, 2009

(65) Prior Publication Data  
US 2010/0085453 A1 Apr. 8, 2010

(30) Foreign Application Priority Data  
Oct. 7, 2008 (KR) .......................... 10-2008-0098409

(51) Int. Cl.  
*G02B 13/16* (2006.01)  
*H04N 5/225* (2006.01)

(52) U.S. Cl. ...................... 348/335; 348/344; 250/208.1; 359/290

(58) Field of Classification Search .......... 348/335–340, 348/79, 82–85, 272, 273, 290, 342–344; 359/290, 296; 250/208.1  
See application file for complete search history.

(56) References Cited

U.S. PATENT DOCUMENTS

| | | | |
|---|---|---|---|
| 6,982,743 B2 | 1/2006 | Danilidis et al. | |
| 7,402,803 B1 * | 7/2008 | Wagner et al. | 250/338.3 |
| 7,767,951 B1 * | 8/2010 | Deliwala et al. | 250/208.1 |
| 2002/0030163 A1 * | 3/2002 | Zhang | 250/330 |

FOREIGN PATENT DOCUMENTS

| | | |
|---|---|---|
| JP | 10-210486 | 8/1998 |
| JP | 2002-142228 | 5/2002 |
| JP | 2006-238093 | 9/2006 |
| KR | 10-1994-0022881 | 10/1994 |
| KR | 1020070109338 | 11/2007 |
| KR | 1020080053002 | 6/2008 |

* cited by examiner

*Primary Examiner* — Nelson D. Hernández Hernández  
(74) *Attorney, Agent, or Firm* — NSIP Law

(57) ABSTRACT

An image sensing apparatus, particularly, an apparatus for optically combining visible images with far-infrared images is provided in which performing a separate signal processing may not be needed. The image combining apparatus emits light that is sensed by an image sensor, and reflects the light toward the image sensor in response to far-infrared rays being sensed from an object, thereby converting far-infrared information into information that can be sensed by the image sensor.

10 Claims, 3 Drawing Sheets

FIG. 4

| R | G | R | G |
|---|---|---|---|
| G | B | G | B |
| R | G | R | G |
| G | B | G | B |

FIG. 5

| R | G | R | G |
|---|---|---|---|
| NIR | B | NIR | B |
| R | G | R | G |
| NIR | B | NIR | B |

APPARATUS FOR OPTICALLY COMBINING VISIBLE IMAGES WITH FAR-INFRARED IMAGES

CROSS-REFERENCE TO RELATED APPLICATION

This application claims the benefit under 35 U.S.C. §119 (a) of Korean Patent Application No. 10-2008-0098409, filed on Oct. 7, 2008 in the Korean Intellectual Property Office, the disclosure of which is incorporated herein in its entirety by reference.

BACKGROUND

1. Field

The following description relates to an image sensing technology, and more particularly, to an image sensing apparatus which senses visible images and far-infrared images.

2. Description of the Related Art

Image sensing technologies have been developed based on the spectrum of light that is visible to humans. Fortunately, the spectrum of light that is visible to humans can be sensed by silicon, which is widely used as a semiconductor material. However, research on infrared image sensors has also been conducted, to permit the viewing of objects when there is little visible light.

In the case of near-infrared rays, since they can be sensed by silicon, acquiring infrared images is not particularly difficult. However, since most objects emit little near-infrared rays at ordinary temperature, near-infrared rays are sensed from the light that is reflected from objects. That is, near-infrared images depend on the optical reflectivities of object surfaces. For example, since the surfaces of leaves reflect near-infrared rays very well, the near-infrared image of leaves will appear bright, while the near-infrared image of the sky will appear very dark since sky reflects little near-infrared rays.

Most objects viewed by humans emit a large amount of far-infrared rays at ordinary temperature, and, accordingly, research has been conducted on far-infrared rays. However, a specific sensor is needed to sense far-infrared rays, since far-infrared rays cannot be sensed by silicon. Far-infrared rays allow humans to view objects in dark places, and provide information about the temperatures of objects. One example is to acquire images using both a visible image camera and a far-infrared image camera and combine the images. Since the two cameras are not aligned on the same focus line, distortion appears in the combined image.

Further, images may be acquired using sensors and signal readout circuits. The images may then be combined using a digital signal processor (DSP). However, since two signal readout circuits and additional DSP signal processing are used, costs and power consumption are relatively high, and operating at high speed is difficult.

SUMMARY

According to one general aspect, there is provided an apparatus for optically combining a visible image with a far-infrared image, including an image sensor that includes a sensed wavelength range, an inner light source configured to emit light having a wavelength range within the sensed wavelength range, a splitter configured to split light received from an object into visible light and far-infrared rays; a micro cantilever configured to sense the far-infrared rays split from the splitter, and further configured to reflect and transfer the light emitted from the inner light source, wherein in response to the far-infrared rays being sensed, the micro cantilever reflects and transfers the light emitted from the inner light source to the image sensor.

The micro cantilever may include a far-infrared sensitizer configured to absorb the far-infrared rays, wherein the temperature of the far-infrared sensitizer rises in response to absorbing the far-infrared rays; a bimetal configured to change shape in response to an increase in temperature; and a reflective plate configured to reflect the light emitted from the inner light source.

The image sensor may be configured to sense visible light or near-infrared rays, and convert the sensed visible light or the sensed near-infrared rays into an electrical signal. The image sensor may be a CMOS image sensor or a CCD image sensor.

The inner light source may be configured to emit white light, visible light having a specific color, or near-infrared rays.

Also, the light combining apparatus may include a filter disposed in front of the image sensor. As one example, the filter may be a three-color filter configured to transmit only red, green and blue lights. As another example, the filter may be a four-color filter configured to transmit only red, green and blue light, and near-infrared rays.

The splitter may be configured to transmit the visible light among the light incident from the object, and reflect the far infrared rays among the light incident from the object.

Other features and aspects will be apparent from the following detailed description, the drawings, and the claims.

BRIEF DESCRIPTION OF THE DRAWINGS

FIG. 4 is a diagram illustrating an exemplary three-color filter; and

FIG. 5 is a diagram illustrating an exemplary 4-color filter.

Figure 1:
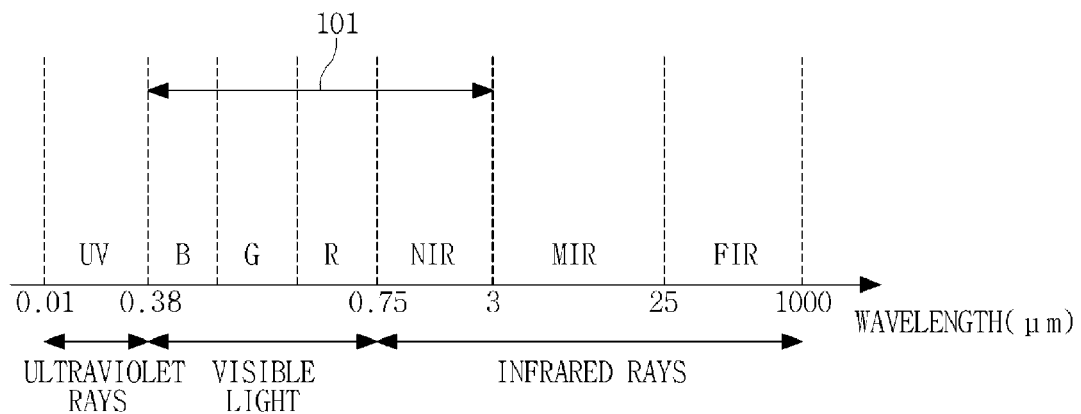
FIG. 1 is a diagram illustrating an exemplary optical spectrum.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

FIG. 1 is a diagram illustrating an exemplary optical spectrum.

Referring to FIG. 1, light can be classified into ultraviolet rays, visible light, and infrared rays, according to its wavelength. Infrared rays can further be classified into near-infrared rays (NIR), mid infrared rays (MIR), and far-infrared rays (FIR). As illustrated in FIG. 1, visible light, or white light, has a wavelength range of about 0.38 to 0.75 µm, near-infrared rays have a wavelength range of about 0.75 to 3 μm, and far-infrared rays have a wavelength range of about 25 to 1000 μm.

At typical room temperature, most objects reflect more far-infrared rays than near-infrared rays. By sensing far-infrared rays from a certain object, the object can be seen even if there is little visible light, and various information, for example about the temperature of the object, may also be obtained.

In the case of a silicon-based image sensor, since it can sense only the wavelength range 101 of visible light and near-infrared rays, it is difficult to obtain information about the far-infrared rays emitted from a certain object through a silicon-based image sensor. However, the examples described herein permit obtaining information about the far-infrared rays emitted from a certain object using a silicon-based image sensor.

Figure 2:
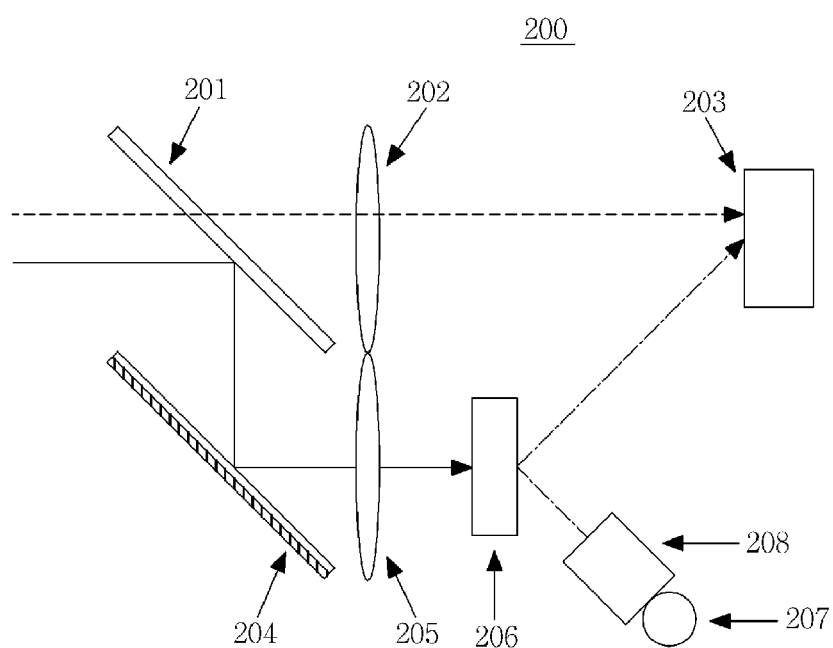
FIG. 2 is a diagram illustrating an exemplary construction of a light combining apparatus.

FIG. 2 is a diagram illustrating an exemplary construction of a light combining apparatus 200 for optically combining visible images with far-infrared images.

Referring to FIG. 2, the light combining apparatus 200 includes a splitter 201, a visible lens 202, an image sensor 203, an infrared mirror 204, an infrared lens 205, a micro cantilever 206, an inner light source 207, and a collimator 208.

The splitter 201 splits light incident from a subject into visible light and far-infrared rays. For example, the splitter 201 transmits visible light among light incident from a subject, and reflects far-infrared rays among the incident light.

The visible light which has passed through the splitter 210 is input to the image sensor 203 via the visible lens 202.

The image sensor 203 may be a silicon-based semiconductor sensor. According to one example, the image sensor 203 may be a CMOS image sensor or a CCD image sensor. Accordingly, the image sensor 203 can sense visible light and near-infrared rays, and convert them into electrical signals. Also, the image sensor 203 may further include a signal readout circuit for reading out electrical signals, an analog-to-digital converter (ADC) for converting analog signals into digital signals, a digital signal processor for processing signals and forming images, etc.

The far-infrared rays reflected by the splitter 201 are again reflected by the infrared mirror 204, and input to the micro cantilever 206 via the infrared lens 205.

The micro cantilever 206 senses the far-infrared rays, and reflects light emitted from the inner light source 207 toward the image sensor 203 according to the sensed far-infrared rays. For example, the micro cantilever 206 reflects light emitted from the inner light source 207 toward the image sensor 203, whenever a far-infrared ray is sensed.

The micro cantilever 206 may include a material whose temperature rises when absorbing far-infrared rays, a structure whose shape changes with an increase in temperature, and a reflector for reflecting light emitted from the inner light source 207 toward the image sensor 203. Accordingly, if the micro cantilever 206 senses far-infrared rays, the temperature of the micro cantilever 206 rises, and the shape of the micro cantilever 206 changes with the increase in temperature, so that light emitted from the inner light source 207 is transferred to the image sensor 203.

The inner light source 207 emits light having a wavelength range which can be sensed by the image sensor 203. For example, the inner light source 207 emits light having a wavelength range corresponding to the region 101 in FIG. 1. The light is incident to the micro cantilever 206 via the collimator 208.

The inner light source 207 may emit various wavelengths of light. For example, the light may be visible light having a specific color, such as red or white light. As another example, the light may be near-infrared rays.

According to the above-described construction, if far-infrared rays emitted from a certain subject are received, the micro cantilever 206 transfers light emitted from the inner light source 207 to the image sensor 203. The micro cantilever 206 converts received far-infrared information into visible light information or near-far infrared information. The visible light information or near-infrared information is input to the image sensor 203 together with the original visible light information of the subject, so that a visible light image can be optically combined with a far-infrared image without having to perform any separate processing.

Figure 3:
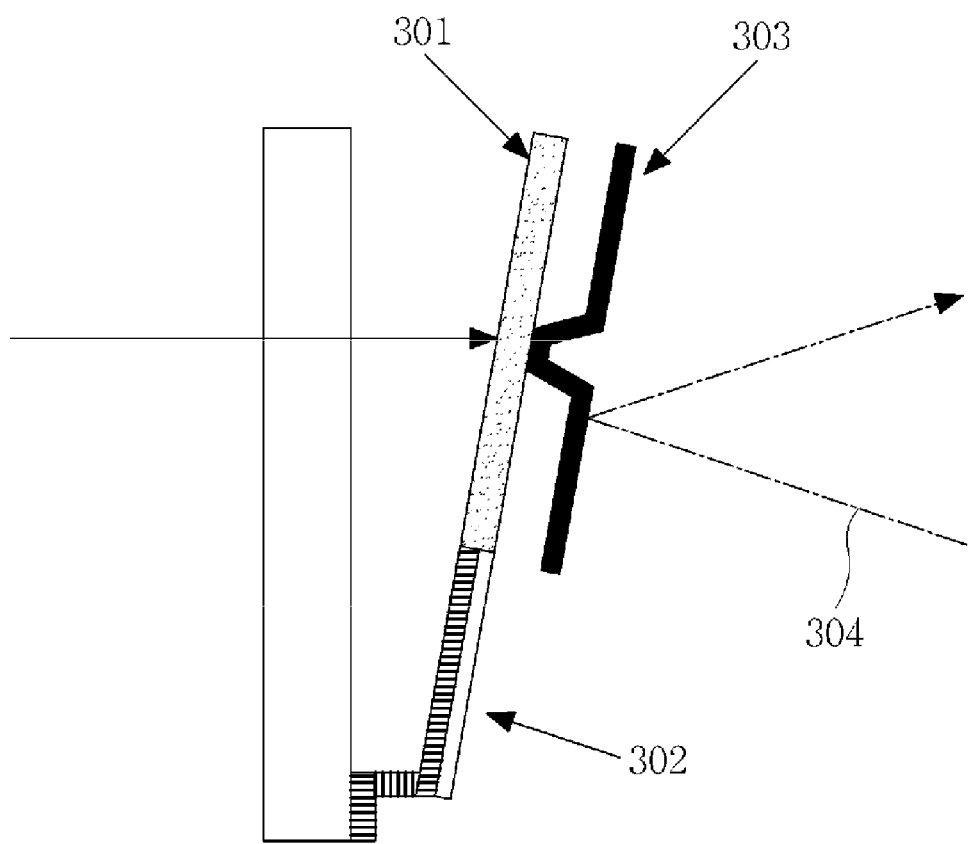
FIG. 3 is a diagram illustrating an exemplary micro cantilever.

FIG. 3 is a diagram illustrating an exemplary micro cantilever 206.

Referring to FIG. 3, the micro cantilever 206 includes a far-infrared sensitizer 301, a bimetal 302, and a reflective plate 303.

The far-infrared sensitizer 301 can absorb far-infrared rays, and is constructed of a material whose temperature rises when absorbing far-infrared rays. For example, the far-infrared sensitizer 301 may be constructed of Vanadium Oxide (VOx), Amorphous Silicon (a-Si), Titanium (Ti), etc.

The bimetal 302 is formed by overlapping two metals having different expansion coefficients as related to temperature, and is integrated into the far-infrared sensitizer 301. Accordingly, when far-infrared rays are incident to the far-infrared sensitizer 301, the temperature of the far-infrared sensitizer 301 rises, the increase in temperature is transferred to the bimetal 302, and thus the bimetal 302 distorts.

The reflective plate 303, which has a reflective surface for reflecting light 304 emitted from the inner light source 207, can change an angle at which the light 304 is reflected as the bimetal distorts.

A plurality of micro cantilevers 206 each having, for example, the construction as illustrated in FIG. 3, may be provided in the form of an array. Such an array may correspond to the respective pixels of the image sensor 203.

The light combining apparatus 200 will be described below, with reference to FIGS. 2 and 3.

If a visible image and a far-infrared image are both received by the light combining apparatus 200, the visible light is input to the image sensor 203 through the splitter 201, and the far-infrared rays are reflected by the splitter 201 and input to the micro cantilever 206. The inner light source 207 emits light having a wavelength range which can be sensed by the image sensor 203. The micro cantilever 206 senses the light emitted from the inner light source 207 and transfers the light to the imager sensor 203 only when the far-infrared rays are sensed.

Accordingly, far-infrared information, which cannot be sensed by the image sensor 203, is mapped to visible light information or near-infrared information, which can be sensed by the image sensor 203. The visible light information or near-infrared information is then transferred to the image sensor 203, and the visible light image can be optically combined with the far-infrared image without having to perform any separate signal processing.

FIG. 4 is a diagram illustrating an exemplary three-color filter, wherein the three-color filter may be included in the front terminal (that is, a terminal to which light is incident) of the image sensor 203.

In FIG. 4, R, G, and B respectively represent components for selectively transmitting red, green and blue colors, respectively. If the inner light source 207 emits white light or visible light having a specific color together with the three-color filter, far-infrared information can be converted into specific color information or brightness information.

For example, if the inner light source 207 emits red-colored light, the higher temperature component will appear to be redder. Also, if the inner light source 207 emits white light, the higher temperature component will appear to be brighter.

FIG. 5 is a diagram illustrating an exemplary four-color filter. The filter may be included in the front terminal (that is, a terminal to which light is incident) of the image sensor 203.

In FIG. 5, R, G, and B respectively represent components for selectively transmitting red, green and blue colors, respectively, and NIR represents components for selectively transmitting near-infrared rays. If the inner light source 207 emits near-infrared rays together with the four-color filter, far-infrared information can be converted into near-infrared information.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for optically combining a visible image with a far-infrared image, comprising:
   an image sensor that includes a sensed wavelength range;
   an inner light source configured to emit light having a wavelength range within the sensed wavelength range;
   a splitter configured to split light received from an object into visible light and far-infrared rays; and
   a micro cantilever configured to sense the far-infrared rays split from the splitter, and further configured to reflect and transfer the light emitted from the inner light source,
   wherein, in response to the far-infrared rays being sensed, the micro cantilever reflects and transfers the light emitted from the inner light source to the image sensor.

2. The apparatus of claim 1, wherein the micro cantilever comprises:
   a far-infrared sensitizer configured to absorb the far-infrared rays, wherein the temperature of the far-infrared sensitizer rises in response to absorbing the far-infrared rays;
   a bimetal configured to change shape in response to an increase in temperature; and
   a reflective plate configured to reflect the light emitted from the inner light source.

3. The apparatus of claim 1, wherein the image sensor is configured to sense visible light or a near-infrared rays, and convert the sensed visible light or the sensed near-infrared rays into an electrical signal.

4. The apparatus of claim 1, wherein the image sensor comprises a CMOS image sensor or a CCD image sensor.

5. The apparatus of claim 1, wherein the inner light source is configured to emit white light.

6. The apparatus of claim 1, wherein the inner light source is configured to emit visible light having a specific color.

7. The apparatus of claim 1, wherein the inner light source is configured to emit near-infrared rays.

8. The apparatus of claim 1, further comprising a three-color filter disposed in front of the image sensor and configured to transmit only red light, green light or blue light.

9. The apparatus of claim 1, further comprising a four-color filter disposed in front of the image sensor and configured to transmit only red light, green light, blue light, or near-infrared rays.

10. The apparatus of claim 1, wherein the splitter is configured to transmit the visible light among the light incident from the object, and reflect the far-infrared rays among the light incident from the object.

* * * * *